US008719212B2

(12) United States Patent
Khoukhi

(10) Patent No.: US 8,719,212 B2
(45) Date of Patent: May 6, 2014

(54) PARALLEL KINEMATIC MACHINE TRAJECTORY PLANNING METHOD

(75) Inventor: Amar Khoukhi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 518 days.

(21) Appl. No.: 13/103,950

(22) Filed: May 9, 2011

(65) Prior Publication Data

US 2012/0290131 A1    Nov. 15, 2012

(51) Int. Cl.
*G06F 17/10* (2006.01)
*G06F 19/00* (2011.01)

(52) U.S. Cl.
USPC ............... 706/52; 706/48; 700/49; 700/50; 700/36; 701/1

(58) Field of Classification Search
USPC ............ 701/1, 98, 93, 36, 40; 700/49, 29, 28, 700/12, 50, 36, 33, 65; 706/46, 45, 47, 48, 706/15, 19, 52
See application file for complete search history.

(56) References Cited

U.S. PATENT DOCUMENTS

| | | | | |
|---|---|---|---|---|
| 6,922,681 | B2 * | 7/2005 | Fromherz et al. | 706/23 |
| 7,184,992 | B1 * | 2/2007 | Polyak et al. | 706/46 |
| 7,216,113 | B1 * | 5/2007 | Goldwasser et al. | 706/47 |
| 8,250,009 | B1 * | 8/2012 | Breckenridge et al. | 706/14 |
| 8,332,337 | B2 * | 12/2012 | Harrison et al. | 706/20 |
| 8,364,616 | B2 * | 1/2013 | Bhatnagar | 706/19 |
| 8,380,653 | B2 * | 2/2013 | Dance | 706/52 |
| 8,494,994 | B2 * | 7/2013 | Hazan et al. | 706/46 |
| 8,504,175 | B2 * | 8/2013 | Pekar et al. | 700/29 |

OTHER PUBLICATIONS

A. Khoukhi Multi-Objective Trajectory Planning by Augmented Lagrangian and Neuro-Fuzzy Techniques for Robotic Manipulators (Nov. 2006 Thesis École Polytechnique de Montreal Mechanical Engineering Department).
A. Khoukhi, L. Baron, M. Balazinski, Constrained Multi-Objective Trajectory Planning of Parallel Kinematic Machines, *Robotics and Computer Integrated Manufacturing*, 25, pp. 756-769, 2008.
A. Khoukhi, L. Baron, M. Balazinski, A Decoupled Approach to Optimal Time Energy Trajectory Planning of Parallel Kinematic Machines, *Courses and Lectures—International Centre for Mechanical Sciences*, 2006, No. 487, pp. 179-186.

* cited by examiner

*Primary Examiner* — Ronnie Mancho
(74) *Attorney, Agent, or Firm* — Richard C Litman

(57) ABSTRACT

The parallel kinematic machine (PKM) trajectory planning method is operable via a data-driven neuro-fuzzy multistage-based system. Offline planning based on robot kinematic and dynamic models, including actuators, is performed to generate a large dataset of trajectories, covering most of the robot workspace and minimizing time and energy, while avoiding singularities and limits on joint angles, rates, accelerations and torques. The method implements an augmented Lagrangian solver on a decoupled form of the PKM dynamics in order to solve the resulting non-linear constrained optimal control problem. Using outcomes of the offline-planning, the data-driven neuro-fuzzy inference system is built to learn, capture to and optimize the desired dynamic behavior of the PKM. The optimized system is used to achieve near-optimal online planning with a reasonable time complexity. The effectiveness of the method is illustrated through a set of simulation experiments proving the technique on a 2-degrees of freedom planar PKM.

20 Claims, 13 Drawing Sheets

PARALLEL KINEMATIC MACHINE TRAJECTORY PLANNING METHOD

BACKGROUND OF THE INVENTION

1. Field of the Invention

The present invention relates generally to robotics design and control, and particularly to a computerized parallel kinematic machine trajectory planning method.

2. Description of the Related Art

Parallel Kinematic Machines (PKMs) have two basic advantages over conventional machines of serial kinematic structures. First, with PKM structures, it is possible to mount all drives on or near the base. This yields to large payloads capability and low inertia. Indeed, the ratio of payload to the robot load is usually about 1/10 for serial robots, while only 1/2 for parallel ones. Second, the connection between the base and the end-effector (EE) is made with several kinematic chains. This results in high structural stiffness and rigidity. However, the PKM architecture-dependent performance associated with strong-coupled non-linear dynamics makes the trajectory planning and control system design for PKMs more difficult compared to serial machines.

Another major issue for practical use of PKMs in industry is that for a prescribed tool path in the workspace, the control system should guarantee the prescribed task completion within the workspace, for a given set up of the EE (i.e., for which limitations on actuator lengths and physical dimensions are not violated).

Thus, a parallel kinematic machine trajectory planning method solving the aforementioned problems is desired.

SUMMARY OF THE INVENTION

The parallel kinematic machine trajectory planning method is operable via a data-driven, neuro-fuzzy, multi-stage-based system. Offline planning based on robot kinematic and dynamic models, including actuators, is performed to generate a large dataset of trajectories covering most of the robot workspace and minimizing time and energy, while avoiding singularities and limits on joint angles, rates, accelerations and torques. The method implements an augmented Lagrangian solver on a decoupled form of the PKM dynamics in order to solve the resulting non-linear constrained optimal control problem. Using outcomes of the offline-planning, the data-driven neuro-fuzzy inference system is built to learn, capture and optimize the desired dynamic behavior of the PKM. The optimized system is used to achieve near-optimal online planning with a reasonable time complexity. The effectiveness of the method is illustrated through a set of simulation experiments proving the technique on a 2-degrees of freedom planar PKM.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it will be understood that the diagrams in the Figures depicting the parallel kinematic machine trajectory planning method are exemplary only, and may be embodied in a dedicated electronic device having a microprocessor, microcontroller, digital signal processor, application specific integrated circuit, field programmable gate array, any combination of the aforementioned devices, or other device that combines the functionality of the parallel kinematic machine trajectory planning method onto a single chip or multiple chips programmed to carry out the method steps described herein, or may be embodied in a general purpose computer having the appropriate peripherals attached thereto and software stored on non-transitory computer readable media, such as, for example, hard drives, programmable memory chips, floppy disks, USB drives, and the like, that can be loaded into main memory and executed by a processing unit to carry out the functionality and steps of the method described herein.

Figure 1:
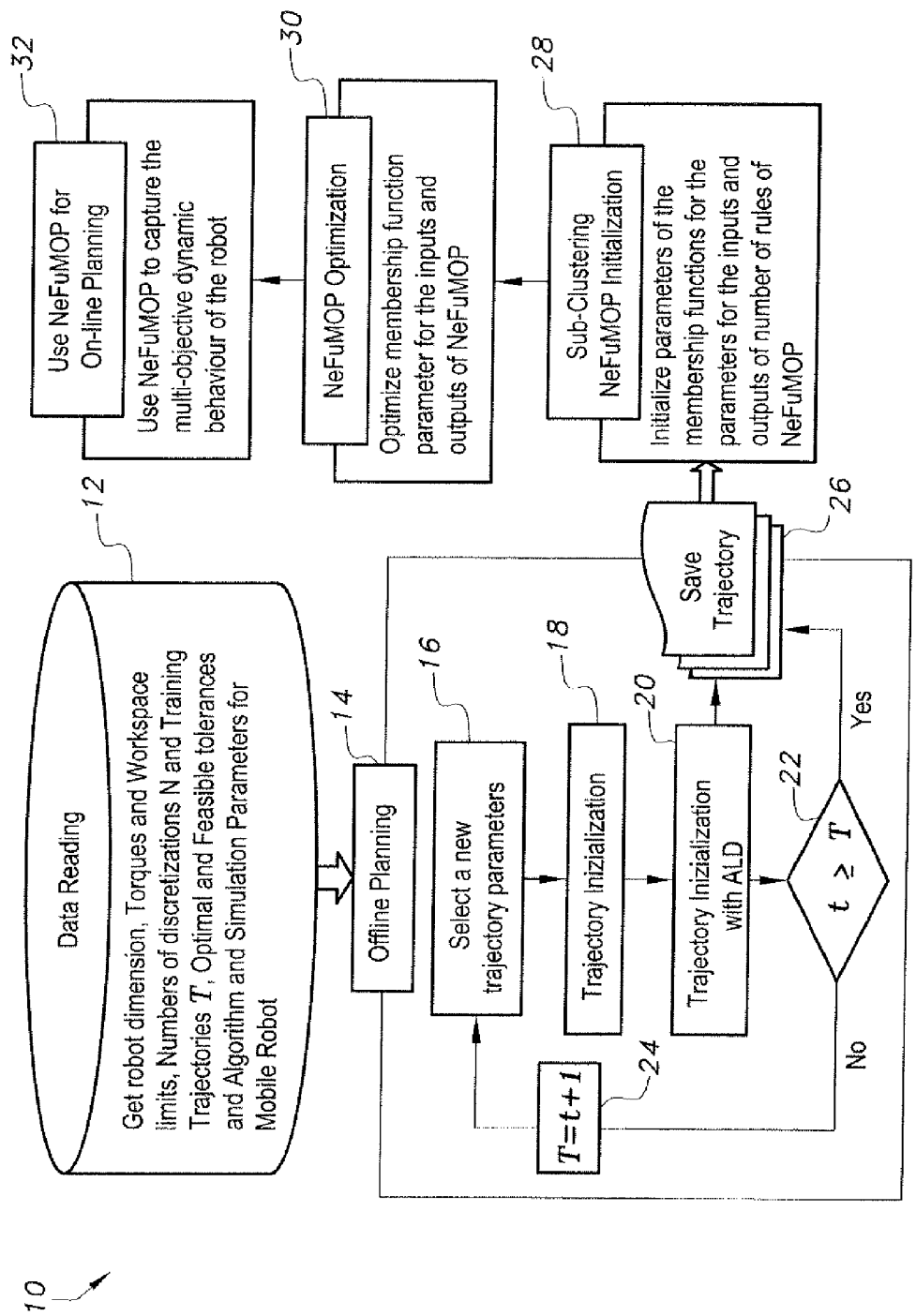
FIG. 1 is a flow diagram of a parallel kinematic machine trajectory planning method according to the present invention.

As shown in FIG. 1, the parallel kinematic machine (PKM) trajectory planning method 10 develops a data-driven, multi-stage, multi-objective motion planning for PKMs. The best trajectories can be obtained by a constrained optimal control based on nonlinear kinematic and dynamic models and constraints relating robot, workspace, and task interactions. Required input data may be stored and read into an algorithm implementing the method 10. The data reading step 12 accomplishes this and reads in robot dimensions, torque, and workspace limits, numbers of discretizations N, training trajectories T, optimal and feasible tolerances, and algorithm and simulation parameters for the PKM.

At step 14, an offline multi-objective planning is initiated and iteratively performed via selection of new trajectory parameters at step 16, initializing the trajectory at step 18, optimizing the trajectory with an augmented Lagrangian with decoupling procedure (ALD) at step 20, checking the offline planning optimization stopping criteria (whether all trajectories have been processed) at step 22, incrementing T at step 24, and saving the offline optimized trajectory at step 26. The ALD step 20 is implemented on a decoupled form of the PKM dynamics. This ALD step is done as many times as possible to cover most of the robot workspace. In the offline planning system 14, one can include contact efforts. Among such models, there are friction and other forces. The generated trajectories are gathered into an input/output dataset. The inputs are the end effector (EE) positions and velocities, and the outputs are the joint actuator torques and sampling periods. Then, at sub-clustering neuro fuzzy multi-objective planning (NeFuMOP) initialization step 28, an adaptive neuro-fuzzy system is built. The fuzzy system build starts with a subtractive clustering, allowing initialization of membership function parameters and number of rules of the neuro-fuzzy system. Then, at NeFuMOP optimization step 30, the fuzzy system is optimized in order to learn and capture the dynamic multi-objective behavior of the PKM. Once the neuro-fuzzy structure, comprising rules number and premise and consequence membership function parameters, is identified and optimized, then, at on-line planning step 32, it is used in a generalization phase to achieve near-optimal online planning with a reasonable computational complexity. Near-optimality stems from the fact that at the generalization level, NeFuMOP interpolates within the parts of the domain that are not covered by offline planning dataset.

Figure 2:
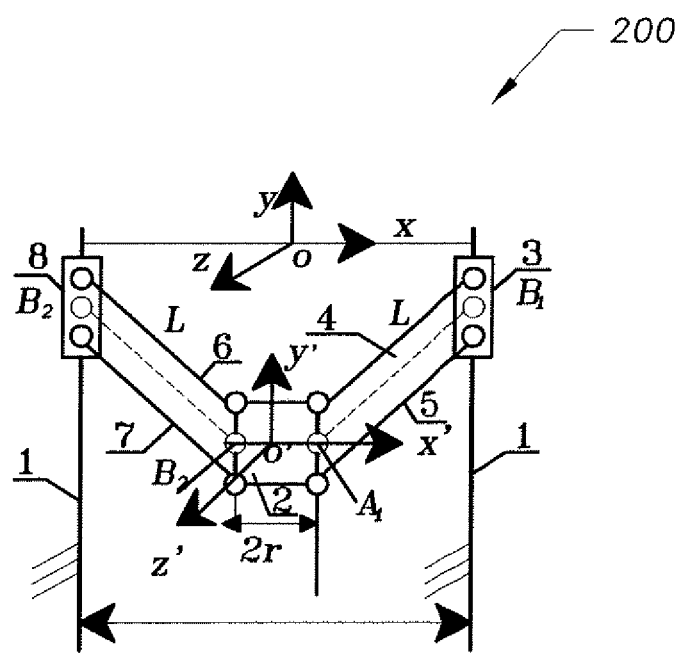
FIG. 2 is a motion diagram of a 2-Degrees-Of-Freedom (DOF) parallel kinematic machine(PKM).

As shown in FIG. 2, the planar PKM 200 has a base 1, an end effector (EE) 2, and two articulated legs L4 and L6. The planar PKM 200 represents a two-degree of freedom (2-DOF) motion of its end effector 2 through articulated motion of its two legs L4 and L6. The EE 2 is connected to the base 1 by two identical legs L4 and L6. Each leg includes a planar four-bar parallelogram, including links 2, 3, 4, and 5 for the first leg and links 2, 6, 7, and 8 for the second leg. Prismatic actuators actuate the links 3 and 8, respectively. Motion of the EE 2 is achieved by a combination of movements of links 3 and 8 that can be transmitted to the EE 2 by the system of the two parallelograms. Due to its structure, the manipulator EE 2 can position a rigid body in 2D space with a constant orientation. To characterize the planar four-bar parallelogram, the chains $A_1B_1$ and $A_2B_2$ are considered, as shown in FIG. 2. Vectors $A_{iA}$ and $A_{iB}$ ($i=1, 2$) define the positions of points $A_i$ in frames A and B, respectively. Vectors $B_{iB}$ ($i=-1, 2$) define the position of $B_i$ points in frame B.

In the Kinematic Model, the geometric parameters of the structure are given as follows:

$$A_iB_i = L (i=1,2) \quad (1)$$

$$A_1A_2 = 2r \text{ and } B_1B_2 = 2R \quad (2)$$

The closure of each kinematic loop passing through the origin of frame A and frame B, and through attachment points $B_i$ on the base 1 and the hip attachment points $A_i$ on the EE 2 is given as:

$$J_l = \begin{bmatrix} \dot{y}_1 \\ \dot{y}_2 \end{bmatrix} = J_x = \begin{bmatrix} \dot{x} \\ \dot{y} \end{bmatrix} \quad (3)$$

$$J_l = \begin{bmatrix} y-y_1 & 0 \\ 0 & y-y_2 \end{bmatrix}, J_x = \begin{bmatrix} r+x+R & y-y_1 \\ x-r+R & y-y_2 \end{bmatrix}$$

where $[y_1\ y_2]^T$ is the position vector of actuated points $B_1$ and $B_2$, $[x\ y]^T$ defines the position of point O' in the fixed frame B, $J_1$ and $J_x$ are the 2-by-2 inverse and forward Jacobian. If $J_1$ is non-singular, the PKM's Jacobian is:

$$J = J_l^{-1} J_x = \begin{bmatrix} (r+x-R)/(y-y_1) & 1 \\ (x-r+R)/(y-y_2) & 1 \end{bmatrix} = \begin{bmatrix} J_{11} & J_{12} \\ J_{21} & J_{22} \end{bmatrix} \quad (4)$$

Figure 3A:
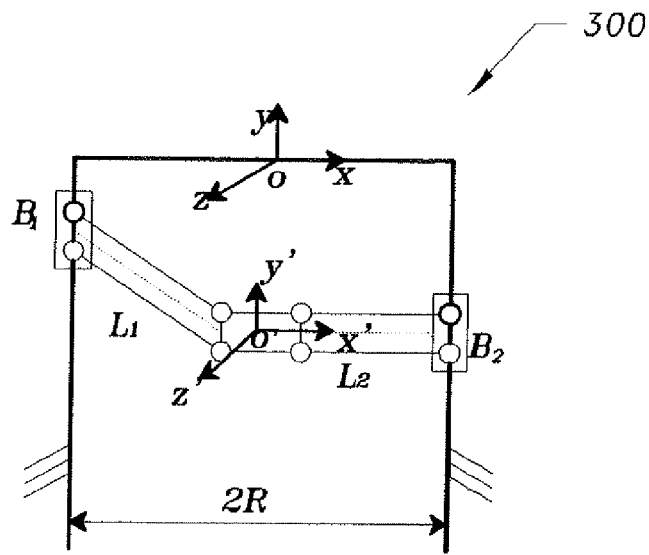
FIG. 3A is a 2-DOF PKM motion diagram showing a type 1 singularity.

Hence, it is clear that singularity occurs in the following cases:

$1^{st}$ case: $|J_1|=0$ and $|J_x| \neq 0$. This corresponds to a type-1 singularity and the situation where $y=y_1$ or $y=y_2$, i.e., the first or the second leg is parallel to the x-axis (300 of FIG. 3A).

Figure 3B:
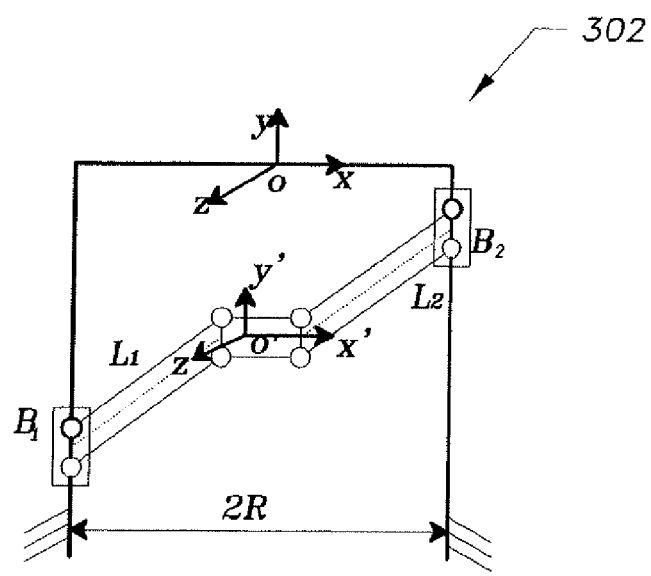
FIG. 3B is a 2-DOF PKM motion diagram showing a type 2 singularity.

$2^{nd}$ case: $|J_1| \neq 0$ and $|J_x|=0$. This is a type-2 singularity where a pose for four bars of the parallelogram in one of the two legs are parallel to each other, (e.g., $x+r=R$ for the first leg for $x \geq 0$, and $x+R=r$ for the second leg for $x \leq 0$) (302 of FIG. 3B).

$3^{rd}$ case: $|J_1|=0$ and $|J_x|=0$. This is a type-3 singularity for which the two legs are both parallel to the x-axis. This is characterized by a geometric parameter condition given by:

$$L+r=R \quad (5)$$

These parameters are designed, such that (5) never holds.

In the Dynamic Model, for the offline planning system, contact efforts may be included. Among such models, there are friction and other application-specific forces. This can increase task achievement success in many practical applications, such as grinding or screwing. It allows avoiding actuator saturation and improves the trajectory planning performance. One way to do so is by adding these efforts as disturbance inputs to the dynamic equations. The joint space inverse dynamic model including contact forces is given as:

$$\tau = M(q)\ddot{q} + N(q,\dot{q}) + G(q) + J^T f_c(\dot{q}) \quad (6)$$

where $\tau$ is the torques vector produced by joint actuators, q, $\dot{q}$, $\ddot{q}$ are joint positions, rates and accelerations, M(q) is the inertia matrix, N(q, $\dot{q}$) and G(q) are the Coriolis and centrifugal, and gravitational forces, respectively, J is the PKM Jacobian and $f_c$ is the contact force. The model in equation (6) is represented as follows:

$$\ddot{q} = M^{-1}(q)[\tau - N(q,\dot{q})\dot{q} - G(q) - J^T f_c(\dot{q})] \quad (7)$$

By defining $[x_1, x^2]^T = (q, \dot{q})^T$, Equation (7) is re-written as:

$$\dot{x} = f(x, \tau, h) \quad (8)$$

where $x_1$ and $x_2$ denote the two-dimension joint positions and velocities, while f describes the dynamics of the PKM.

With respect to constraints modeling, in addition to eq. (8), applicable constraints are the sampling period limits:

$$h_{Min} \leq h \leq h_{Max} \quad (9)$$

the boundary conditions:

$$x_0 = x_s, x_N = x_T \quad (10)$$

the actuator torque limits:

$$\tau_{Min} \leq \tau_k \leq \tau_{Max} \quad (11)$$

and the workspace limitations:

$$x_{Min} \leq x_k \leq x_{Max}, y_{Min} \leq y_k \leq y_{Max}, k=0,2,\ldots,N. \quad (12)$$

Regarding the singularity avoidance, because the robot Jacobian allows motion and force transformation from actuated legs to the EE, the leg forces demand at a given point on the trajectory must be continuously checked for possible violation of the preset limits as the manipulator moves close to singularity. The condition number of the Jacobian was suggested and used as a local performance index for evaluating the velocity, accuracy, and rigidity mapping characteristics between the joint variables and the moving platform, $$k_{Min} \leq \text{Cond}(J(x_k)) \leq k_{Max} \quad (13)$$

where $k_{Min}$ and $k_{Max}$ correspond respectively to the minimum and maximum values for the tolerances on the condition number.

The condition number for the PKM at hand is defined as $$1 \leq \kappa = \frac{\sigma_1}{\sigma_2} \leq \infty,$$

where $\sigma_1$ and $\sigma_2$ are the minimum and maximum singular values of the Jacobian associated with a given posture. For the parallel robot under study, one has $$\kappa = \sqrt{\frac{A + \sqrt{B}}{A - \sqrt{B}}},$$

with:

$$A = p^2 + q^2 + 2, B = (p^2 + q^2)^2 + 8pq + 4, \text{ and}$$

$$p = \frac{x - r + R}{y - y_1}, q = \frac{x + r - R}{y - y_2}$$

Imposed passages are constraints quantified by a set of L poses with $p_i$ referring to the $i^{th}$ imposed Cartesian position on the EE.

$$\|p - p_l\| \leq T_{PassThlp}, l=1, \ldots, L \quad (14)$$

where $T_{PassThlp}$ is the passage tolerance.

For writing simplicity, all equality constraints are given as:

$$s_i(x)=0, i=1, \ldots, I \quad (15)$$

All inequality constraints are noted as, $$g_j(x,\tau,h) \leq 0, j=1, \ldots, J, \quad (16)$$

regardless of whether they depend only on the state, the control variables, or both.

The performance index is obtained by considering that the discrete-time optimal control problem, which can be stated as: Among all admissible control sequences $(\tau_0, \tau_2, \ldots, \tau_{N-1}) \in C$ and $h \in H$, that allow the robot to move from an initial state $x_0 = x_s$ to a final state $x_N = x_T$, find those that minimize the cost function $E_d$, subject to the constraints in equations (8) through (14), where:

$$\underset{\substack{\tau \in C \\ h \in H}}{\text{Min}} E_d = \left\{ \sum_{k=0}^{N-1} [\tau_k U \tau_k^T + \iota_1 + x_{2k} Q x_{2k}^T] h_k + \frac{1}{2} x_{2N} Q x_{2N}^T \right\} \quad (17)$$

and C and H represent the set of admissible torques and sampling periods, and U, Q and $\tau$ are the weight factors of the electric energy, kinetic energy and travel time, respectively.

The optimization method favors a performance index and Augmented Lagrangian with Decoupling (ALD). Two basic approaches to solving the stated multi-objective non-linear optimal control problem (17) include dynamic programming through global optimal control, and variational calculus through the maximum principle. With the former approach, an optimal feedback control, $\tau^*(x,t)$, can be characterized by solving for a so-called value function through Hamilton-Jacobi-Bellman partial differential equations. For a general system, however, the PDE (partial differential equation) can be solved numerically for very small state dimensions only. If inequality constraints on state and control variables are added, this makes the problem even harder. The present method uses the second approach. An augmented Lagrangian (AL) technique is implemented to solve the multi-objective non-linear optimal control problem of equation (17). This technique transforms the constrained problem into a non-constrained one, where the degree of penalty for violating the constraints is regulated by penalty parameters. Moreover, while ordinary Lagrangian methods are used when the objective function and the constraints are convex, for the case at hand, we cannot tell whether these are convex or not, but they are most likely not.

The AL technique relies on quadratic penalty methods, but reduces the possibility of ill conditioning of the sub-problems that are generated with penalization by introducing explicit Lagrange multipliers estimates at each step into the function to be minimized. However, in developing the first order optimality conditions enabling one to derive the iterative formulas to solve the optimal control problem, in Eq. (8), $\dot{x} = f(x,\tau,h)$ contains the inverse of the total inertia matrix $M^{-1}(x)$ of the PKM, including struts and actuators, as well as their Coriolis and centrifugal wrenches $N(x_1, x_2)$. In computing the adjoin states $\lambda_k$, one has to determine the inverse of the mentioned inertia matrix and its derivatives with respect to state variables, resulting in an intractable complexity. This major computational difficulty is solved using a linear-decoupled formulation.

I present Theorem 1: Under the invertibility condition of the inertia matrix, the control law defined in the Cartesian space as:

$$u = MJ^{-1}v + Nx_2 + G + [J^T - MJ^{-1}C]f_c - MJ^{-1}\dot{J}x_2 \quad (18)$$

which allows the robot to have a linear and decoupled behavior with the following dynamic equation, given in the task space:

$$\ddot{x} - v = Cf_c \quad (19)$$

For writing convenience, the second order system of the decoupled dynamics of equation (19) is re-written as:

$$\dot{x} = (\dot{x}, v - Cf_c) = f_c^D(v) \quad (20)$$

Because the ordinary differential equation dynamic governing the robot behavior is of a stiff type, a multi-step Adams predictive-corrective technique is used to approximate the discrete dynamic model. This is initialized with a fourth order Runge-Kutta (RK4). The resulting approximated discrete decoupled dynamics will be as:

$$x_{k+1} = f_k^D(x_k, v_k, h) \quad (21)$$

The decoupled technique alleviates the need of calculating the inertia matrix inverse and derivatives with respect to state variables at each iteration. However, the non-linearity of the initial problem is neither removed nor reduced. It is only transferred to the objective function. The decoupling transforms the discrete optimal control problem into finding optimal sequences of sampling periods and acceleration inputs (h, $v_0, v_2, \ldots, v_{N-1}$), allowing the robot to move from an initial state $x_0 = x_S$ to a final state $x_N = x_T$, while minimizing the cost function and satisfying the above mentioned constraints.

The augmented Lagrangian with decoupling (ALD) is:

$$L_\mu^D(x_k, v_k, h_k, \lambda_k, \rho_k, \sigma_k) = \quad (22)$$

$$\sum_{k=0}^{N-1} h_k \begin{bmatrix} t + x_{2k} Q x_{2k}^T [M(x_{1k})v_k + \\ N(x_{1k}, x_{2k}) + G(x_{1k}) + J^T(x_{1k})f_c(x_{2k})]^T \\ U[M(x_{1k})v_k + N(x_{1k}, x_{2k}) + \\ G(x_{1k}) + J^T(x_{1k})f_c(x_{2k})] \end{bmatrix} +$$

$$\sum_{k=0}^{N-1} \lambda_{k+1}^T [x_{k+1} - f_k^D(x_k, v_k, h_k)] +$$

$$\sum_{k=0}^{N-1} h_k \left[ \sum_{j=1}^{2} \Phi_{\mu_g}(\rho_k^j, g_j(x_k, v_k)) + \Psi_{\mu_g}(\sigma_k^j, s_i(x_k)) \right]$$

where $f_{d_k}^D(x_k, v_k, h_k)$ is defined by the decoupled state eq. (21), N is the total sampling number, $\lambda \in R^{4N}$ designates the co-states, $\sigma$ and $\rho$ are Lagrange multipliers associated to equality and inequality constraints, and $\mu_s$ and $\mu_g$ are the penalty coefficients. The used penalty functions allow relaxation of inequality constraints as soon they are satisfied. These functions are:

$$\Psi_{\mu_s}(a, b) = \left(a + \frac{\mu_s}{2} b\right)^T b, \text{ and} \quad (23)$$

$$\Phi_{\mu_g}(a, b) = \frac{1}{2\mu_g} \{\|\text{Max}(0, a + \mu_g b)\|^2 - \|a\|^2\}$$

The Karush-Kuhn-Tucker first order optimality conditions state that for a trajectory $(x_0, v_0, h_0, \ldots, x_N, v_{N-1}, h_{N-1})$ to be an optimal solution to the problem, there must exist some positive Lagrange multipliers $(\lambda_k, \rho_k)$, unrestricted sign multipliers $\sigma_k$, and finite positive penalty coefficients $u = (\mu_s, \mu_g)$ such that:

$$\frac{\partial L_\mu^D}{\partial x_k} = 0, \frac{\partial L_\mu^D}{\partial v_k} = 0, \frac{\partial L_\mu^D}{\partial h_k} = 0, \frac{\partial L_\mu^D}{\partial \lambda_k} = 0, \frac{\partial L_\mu^D}{\partial \rho_k} = 0, \quad (24)$$

$$\frac{\partial L_\mu^D}{\partial \sigma_k} = 0, \sigma_k^T s(x) = 0, \rho_k^T g(x, v, h) = 0, \text{ and}$$

$$g(x, v, h) \le 0$$

The final state constraint $x_N = x_T$ does not appear in the ALD function (22). This implies that the backward adjoin states integration will start off with $\lambda_N = 0$. Because this constraint should be satisfied at each iteration to enhance the task execution precision, it should be treated through a gradient projection. A re-adjustment is performed with an orthogonal projection on the tangent space of this constraint through the application of a descent direction given according to Theorem 2, which states that the descent direction is expressed as:

$$d = -P_\nu \nabla_\nu L_\mu^D \quad (25)$$

with P being defined as:

$$P = I_d - S^T(SS^T)^{-1} S \quad (26)$$

where $I_d$ is an identity matrix with appropriate dimension and S is the projection matrix on the tangent space of the final state constraint. The re-adjustment process allows satisfying target attainability with any given $\epsilon$ precision. After initialization through a trapezoidal velocity profile, an inner optimization loop solves for the ALD minimization with respect to sampling periods and acceleration variables. The adjoin states are computed backwardly, and the control inputs and the states are updated. All equality and inequality constraints are tested against feasibility tolerances. If non-feasibility holds, the inner optimization unit is started over. If feasibility occurs, i.e., the current penalty values maintain good near-feasibility, a convergence test is made against optimal tolerances. If convergence holds, the optimal results are displayed and the program stops. If non-convergence occurs, the dual part of ALD is further explored to update Lagrange multipliers, penalty, step size, and tolerances in order to force the subsequent iterations to generate increasingly accurate solutions to the primal problem.

A Neuro-Fuzzy Multi-Objective Planning (NeFuMOP) structure is utilized in the optimization process. The outcomes of the so-developed offline trajectory planning system are used to generate an input/output dataset on which to build a neuro-fuzzy multi-objective planner. This neuro-fuzzy system has been implemented on serial manipulator and mobile robots and gave very good results. NeFuMOP is a data-driven neuro-fuzzy system based on Tsukamoto fuzzy inference mechanism. In this mode of reasoning, the consequence linguistic terms are assumed to have a continuous strong monotone membership function. The inputs of the MIMO (multiple-input, multiple-output) fuzzy model are the discrete Cartesian 2-dimensional positions and velocities, $x_d^i = [x_i, y_i, \dot{x}_i, \dot{y}_i]$ $i = 0, \ldots, N$. The outputs are the joint torques and sampling periods, given as $\pi_d = [\pi_1, \pi_2, \ldots, \pi_N]^T$, $\pi_i = [\tau_i, h]^T$, with $\tau_i$ being the vector of joint torques and h being the sampling period. Consider the following input/output entries: $[x_d^1, \pi_d^1, \ldots, (x_d^K, \pi_d^K)]$. The fuzzy rules include:

$R^1$: If $(x_1$ is $A_1^1)$ and $(x_2$ is $A_2^1)$ and $\ldots$ and $(x_4$ is $A_4^1)$, then $(o_1 = c_1^1)$ and $(o_2 = c_2^1)$ and $(o_3 = c_3^1)$; also $R^i$: If $(x_1$ is $A_1^i)$ and $(x_2$ is $A_2^i)$ and $\ldots$ and $(x_4$ is $A_4^i)$, then $(o_1 = c_1^i)$ and $(o_2 = c_2^i)$ and $(o_3 = c_3^i)$;

$R^J$: If $(x_i$ is $A_1^j)$ and $(x_2$ is $A_2^j)$ and $\ldots$ and $(x_4$ is $A_4^j)$, then $(o_1 = c_1^j)$ and $(o_2 = c_2^j)$ and $(o_3 = c_3^j)$ where $x_i$ is the input associated to node 1, and $A_i^j$ is the associated linguistic term.

The membership functions $\mu_{A_i^j}$ the fuzzy sets $A_i^j$ are Gaussian functions given as:

$$\mu_{A_l^j}(x_l) = \exp\frac{-1}{2}\left\{\frac{(x_l - a_l^j)^2}{(b_l^j)^2}\right\}, \quad (27)$$

$$l = 1, \ldots, 4, \, j = 1, \ldots, J$$

where $a_j^j$ and $b_j^j$ are the mean and standard deviation of the $j^{th}$ membership function of the input variable $x_t$, and $c_t^j$ are fuzzy sets defining the consequence of the $j^{th}$ rule, such that:

$$c_t^j = f^{-1}(\mu_{Aj}(x_t)), f: \Re \to [0,1], t=1,\ldots,3, j=1,\ldots,J \quad (28)$$

being a continuous strong monotone function defined as:

$$f(z) = \frac{1}{1 + e^{-(\rho z - \sigma)}} \quad (29)$$

where $\rho$ and $\sigma$ are real numbers affecting the position and slope of the inflection point of f.

Figure 4:
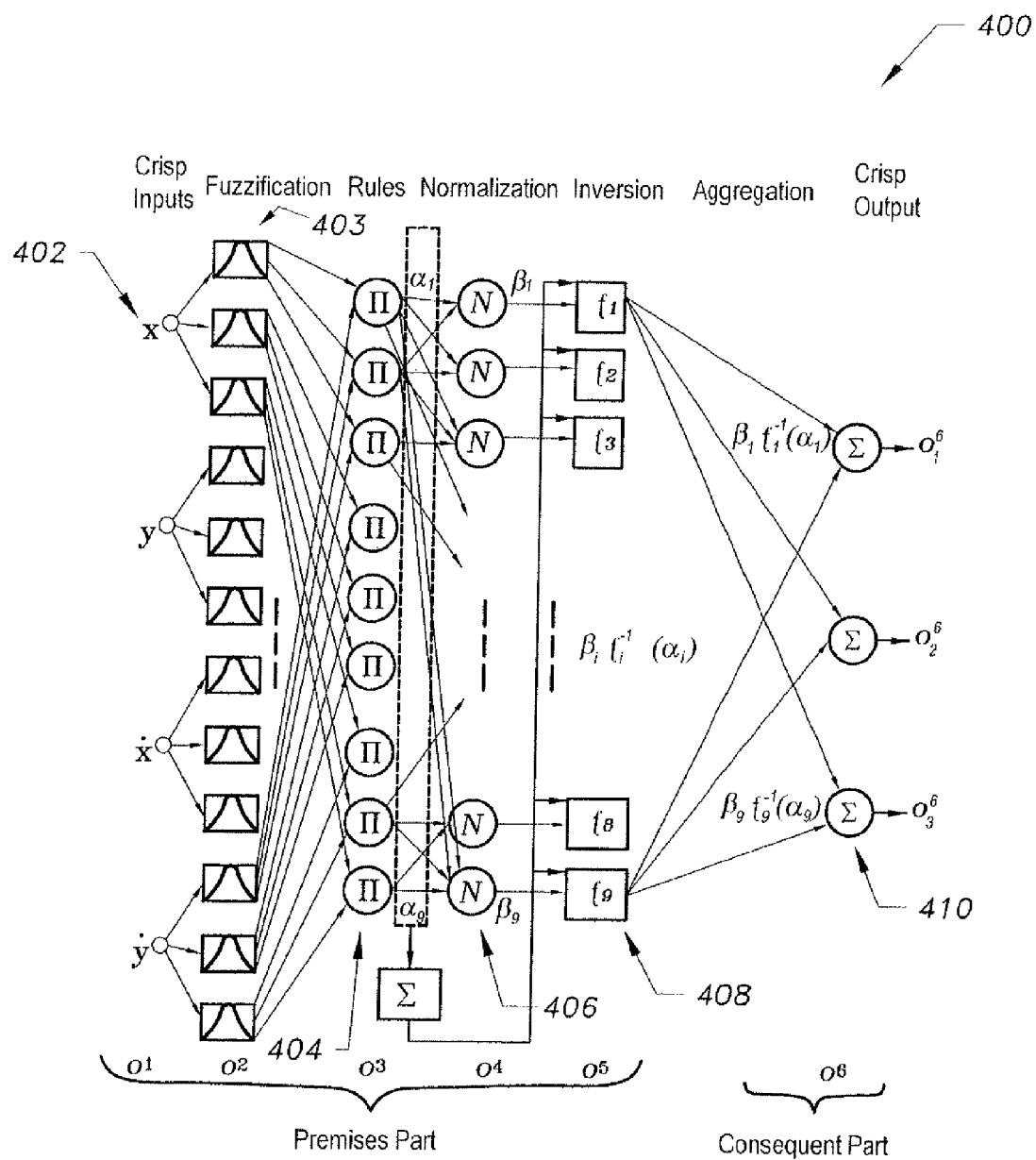
FIG. 4 is a block diagram showing a neuro fuzzy multi-objective planning (NeFuMOP) system used in a parallel kinematic machine trajectory planning method according to the present invention.

As shown in FIG. 4, the NeFuMOP architecture and its learning structure is made of six layers. The first layer is a 4-input layer 402, characterizing the crisp EE position and velocity. The second layer 403 performs the fuzzification of the crisp inputs into linguistic variables through Gaussian transfer functions. The third layer is the rule layer 404, which applies the product t-norm to produce the firing strengths of each rule. This is followed by a normalization layer 406, at which each node calculates the ratio of a rule's firing strength to the sum of all rules firing strengths. The fifth layer 408 performs the inversion. The last layer 410 (output layer) is for aggregation and defuzzification. The output is obtained as the sum of all incoming signals.

Figure 5:
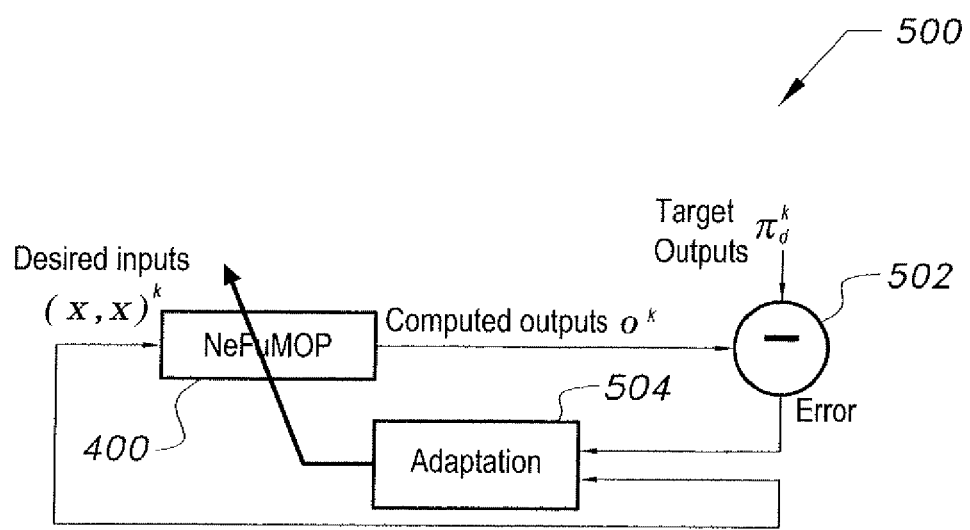
FIG. 5 is a block diagram showing functional operation of the NeFuMOP of FIG. 4.

The learning scheme of NeFuMOP comprises a pair of steps where the network parameters of the premise membership function parameters $a_j$ and $b_j$ and the consequent parameters $\rho_t$, $\sigma_t$ of a fuzzy rule $R^j$ are initialized by partitioning the input/output dataset into clusters. The purpose of clustering is to identify natural grouping of data from the generated large dataset to produce a concise representation of the PKM's behavior, resulting in initial rules that are more tailored to the input data. One assumes that it is not clear how many clusters there should be for the generated offline planning dataset. The subtractive clustering technique is applied to find the number of clusters and their centers. This technique provides a fast one-pass algorithm to take input/output training data to generate a fuzzy inference system that captures the robot dynamic behavior. Each cluster center may be translated into a fuzzy rule for identifying a class. The MATLAB® function subclust is used to initialize and identify these parameters. The structure optimization includes fine-tuning the so-initialized parameters (FIG. 5) using a Levenberg-Marquard version of the gradient back-propagation combined with a least square estimate (LSE).

The optimization structure 500 comprises the NeFuMOP 400 accepting inputs $(x,\dot{x})^k$ and computing outputs $o^k$. A difference comparator 502 compares target outputs $\pi_d^k$ to the computed outputs $o^k$. The resultant error is fed to adaptation block 504 that also receives the inputs $(x,\dot{x})^k$. The adaptation block feeds back to the NeFuMOP 400, adjusting weights until the computed outputs $o^k$ are acceptably close to the target outputs $\pi_d^k$. The cost function is the error between network outputs and the desired outputs relating the PKM dynamic behavior:

$$E = \frac{1}{2}\sum_{k=1}^{K}\|o^k - \pi^k\|^2 = \frac{1}{2}\sum_{k=1}^{K}\sum_{j=1}^{J}\sum_{t=1}^{4}[o_{jt}^k(a_t, b_t, \rho_t, \sigma_t) - \pi_{jt}^k]^2 \quad (30)$$

where $o^k$ is the computed output from the fuzzy system, $\pi_d^k$ is the $k^{th}$ desired output associated with the $k^{th}$ training and dataset entry, and J is the number of rules.

In obtaining the simulation experiment results, training protocol for the neuro-fuzzy system is to learn mostly of the robot workspace. The training protocol is achieved as follows. (i)—Because the order in which the points are presented to the network affects the speed and quality of convergence, and since the robot interpolates between sampling points to build the entire path from a starting point to the end points, the trajectory generation is achieved while ensuring singularity and torque limits avoidance and satisfaction of other constraints. (ii)—Two hundred ALD trajectories for different initial and final EE Cartesian positions are generated. Each trajectory is sampled in twenty discretization points, leading to 4000 data points to perform NeFuMOP training. 80% are used for training, 10% for testing, and 10% for checking.

For offline planning, the focus is on time-energy constrained trajectory planning with the following objectives. (i) Minimize traveling time and kinetic and electric energy while avoiding singularity during the motion. (ii) Satisfy several constraints related to limits on joint positions, rates, accelerations and torques. Viscous and dry frictions are considered. The function arctg is used to approximate the sign function. The program is coded in MATLAB®. A unity value is used for each weight factor in the cost function. The following numeric values are used: The EE mass is $m_{ee}$=200.0 kg, that of each leg is $m_j$=570.5 kg, and that of the slider is $m_s$=70 kg. The platform radius is r=0.75 m the distance R=1.2030 m, and the strut length L=1.9725 m. Table 1 shows the limits of the robot workspace, actuator torques and sampling periods. As for the ALD parameters, the following values had been taken: $\omega_s$=0.5, $\eta_s$=0.5, $\alpha_w$=$\alpha_\eta$=0.4, $\beta_w$=$\beta_\eta$=0.4, $\omega_0$=$\eta_0$=$\eta_{10}$=$10^{-2}$, $\gamma_1$=0.25, $w^*$=$\eta^*$=$\eta_1^*$=$10^{-5}$, $\gamma_2$=1.2, $v$=0.01, $\bar{v}$=0.3. The initial Lagrange multipliers, $\sigma_0, \rho_0$ are set to zero.

TABLE 1

Workspace, actuator torques, and sampling period limits

| Parameter | x-coordinate (m) | y-coordinate (m) | $\tau_1$ (Nm) | $\tau_2$ (Nm) | h (sec) |
|---|---|---|---|---|---|
| max | 0.8 | −0.720 | 550 | 700 | 0.7 |
| min | −0.8 | −1.720 | −550 | −700 | 0.005 |

A sample trajectory starts from an initial Cartesian state position $x_0$=−0.7, $y_0$=−0.1 to a final position $X_T$=0.7, $y_T$=−1.6 (in meters). The initial and final linear and angular velocities are set to zero. The maximum velocity is 0.2 m/sec, and maximum acceleration is 2 m/sec$^2$.

Figure 6A:
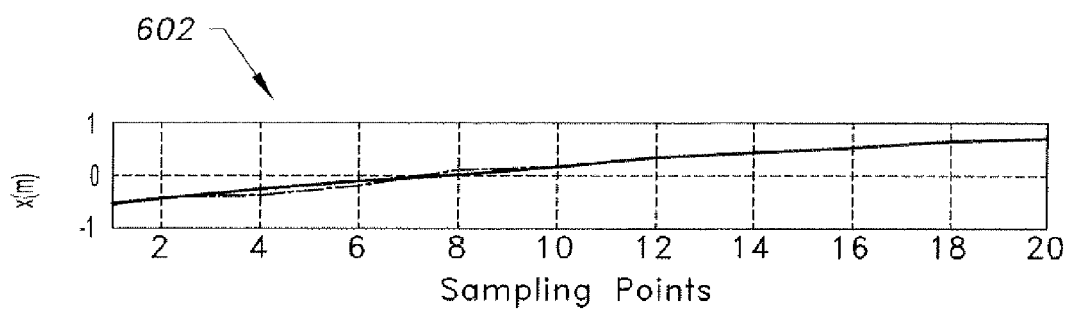
FIG. 6A is an x sampling points plot.
Figure 6B:
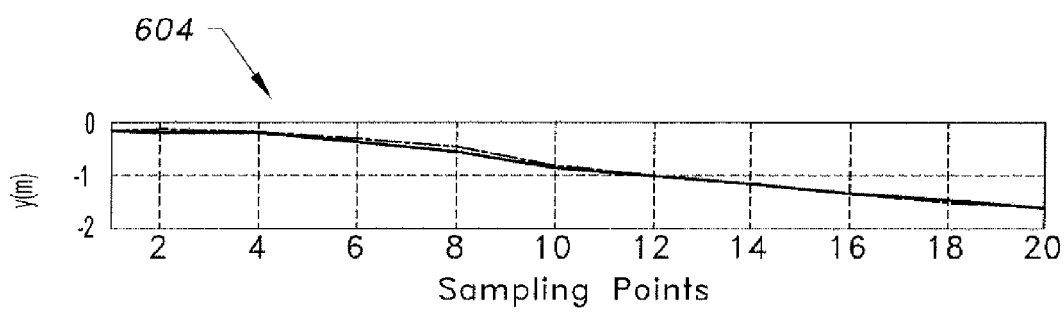
FIG. 6B is a y sampling points plot.
Figure 6C:
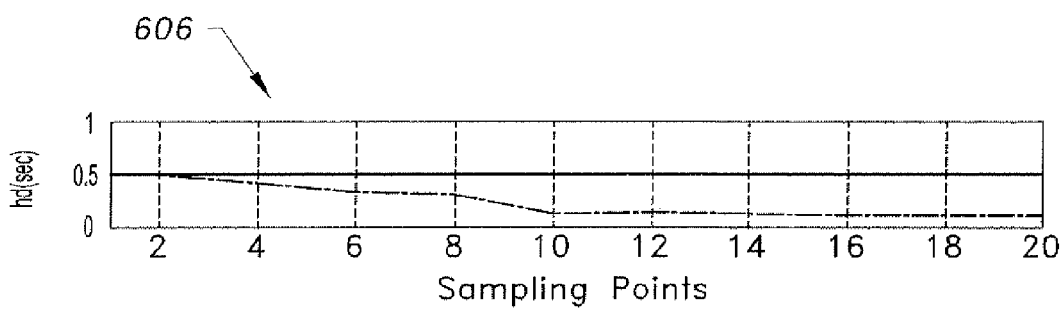
FIG. 6C is a plot of $h_d$ (sec).

The maximum allocated time for this trajectory is 10 sec. FIGS. 6A-6C show simulation results for both initial kinematic and augmented Lagrangian solutions. In FIG. 6A, plot 602, from the top, shows the displacement along x-axis of the EE point of operation. In FIG. 6B, plot 604 shows the displacement along the y-axis of the FE point of operation. In FIG. 6C, plot 606 shows the instantaneous values of consumed time to achieve the trajectory.

Figure 7A:
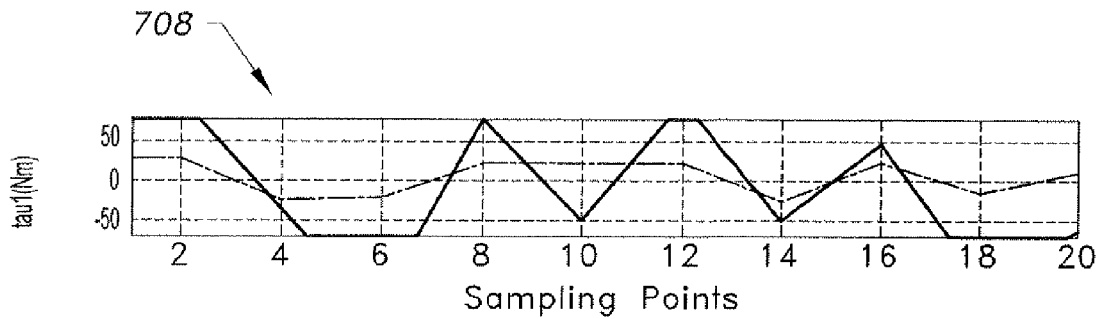
FIG. 7A shows instantaneous variations of joint torques tau 1 force plot.
Figure 7B:
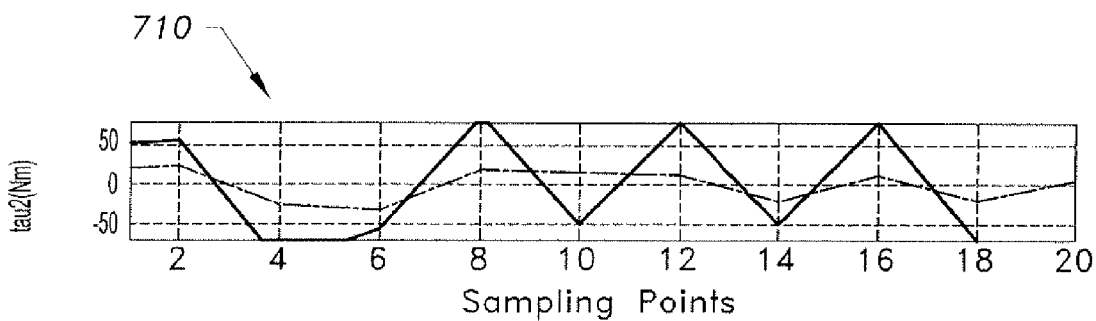
FIG. 7B shows a tau 2 force plot.
Figure 7C:
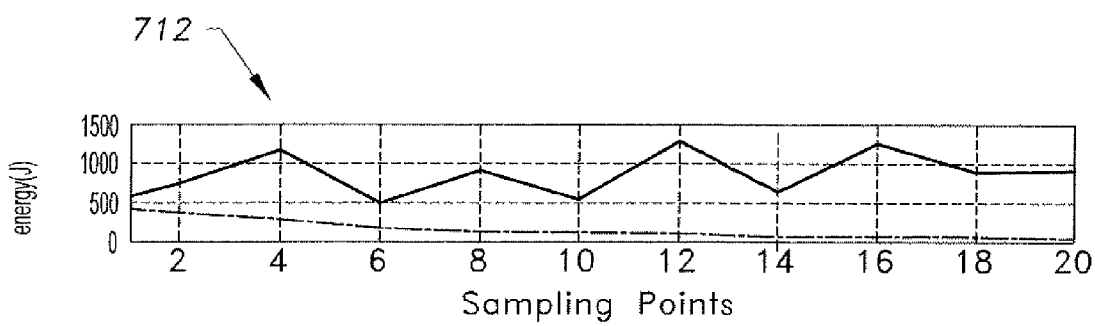
FIG. 7C shows a corresponding energy plot.
Figure 8A:
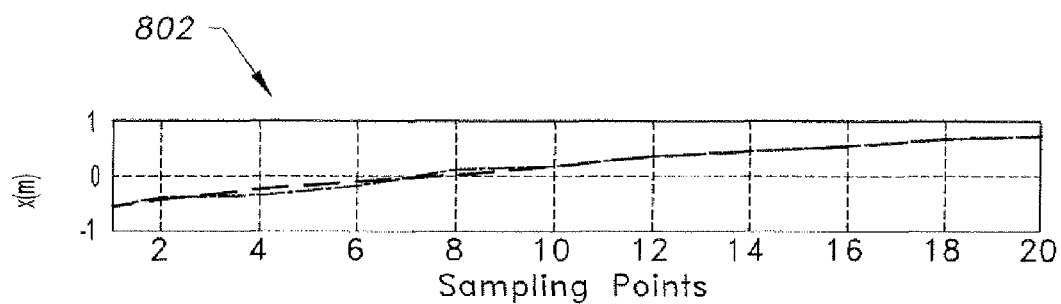
FIG. 8A shows a plot of the x sampling points.
Figure 8B:
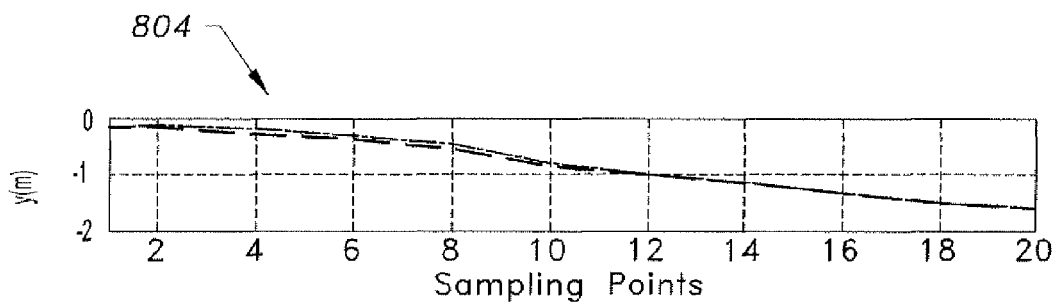
FIG. 8B shows a plot of the y sampling points.
Figure 8C:
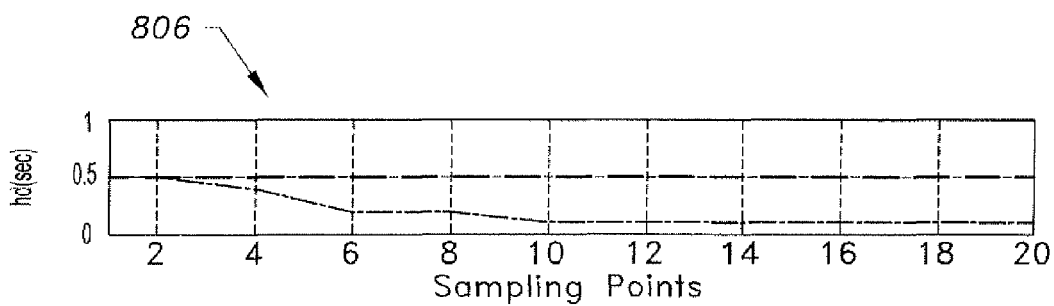
FIG. 8C shows a plot of $h_d$ (sec).

In FIGS. 7A-7B, plots 708 and 710, from the top, show the instantaneous variations of joint torques, while in FIG. 7C, plot 712 shows the instantaneous values of the consumed energy. Although the initial solution is kinematically feasible, when the corresponding torques are computed considering the dynamic model and forces, one obtains torque values that quickly get outside the admissible domain, resulting in high values for energy cost. With the augmented Lagrangian, however, with four inner and seven outer iterations, the variations of the energy consumption increase smoothly and monotonically. In FIGS. 8A-8C, plots 802, 804, and 806 display the simulation outcomes for only the energy criterion (i.e., the time weight is set to zero, so the sampling period is kept constant). A 21% faster trajectory with a time-energy criterion is achieved compared to a trajectory computed with only the minimum-energy criterion (dotted line). The multi-objective trajectories are smoother than minimum time and faster than only minimum energy trajectories. This allows very good reference trajectories for online planning. To analyze with respect to ALD parameters, Table 2 shows comparison of results for different simulation parameters of ALD, where NDisc stands for the number of discretizations, NPrimal is the number of inner optimization loops, NDual is the number of outer optimization loops, $$t_T = \sum_{k=1}^{N} h_k$$

is the total traveling time, $$Energy = \sum_{k=1}^{N} [(\tau_k U \tau_k^T + x_{2k} Q x_{2k}^T)]$$

is the consumed electric and kinetic energy, and APEq and APIneq for Achieved Precision for Equality and Inequality constraints, respectively.

TABLE 2

Convergence history of Minimum Time Energy Planning

| NDisc | NPrimal | NDual | CPU (sec) | t (sec) | Energy (J) | APEq | APIneq |
|---|---|---|---|---|---|---|---|
| 10 | 4 | 7 | 101.62 | 8.41 | 7981.54 | $2.510^{-3}$ | $1.210^{-3}$ |
| 20 | 4 | 7 | 111.25 | 7.11 | 4906.58 | $10^{-3}$ | $1.210^{-3}$ |
| 20 | 5 | 10 | 121.54 | 3.32 | 3548.88 | $3.910^{-4}$ | $2.10^{-4}$ |
| 30 | 5 | 10 | 143.83 | 1.85 | 3921.41 | $3.10^{-5}$ | $3.410^{-5}$ |

Figure 9A:
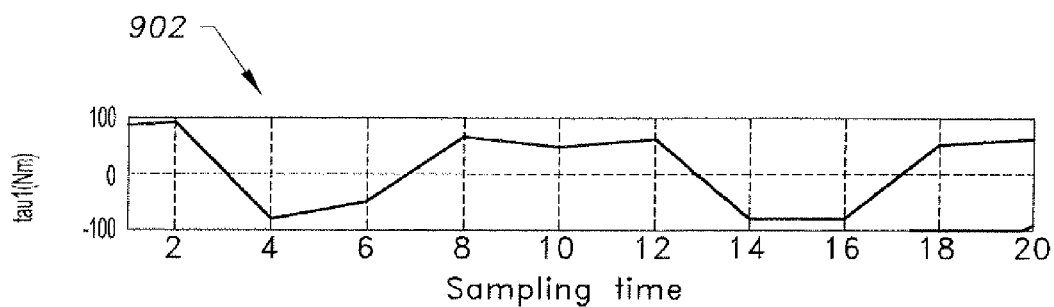
FIG. 9A shows instantaneous variations of joint torques tau 1 force plot (imposed passages).
Figure 9B:
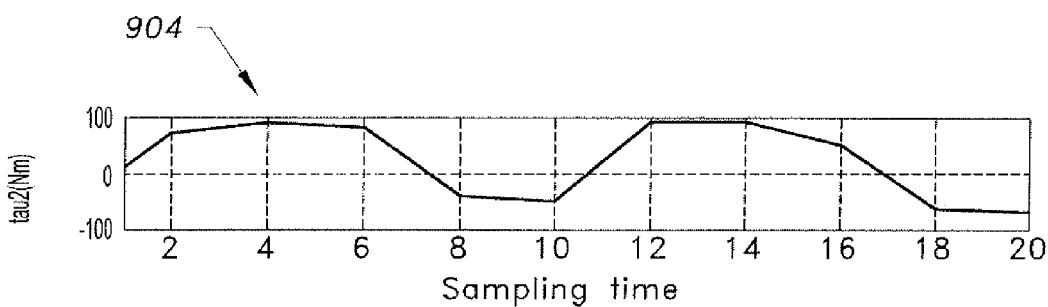
FIG. 9B shows a tau 2 force plot.
Figure 9C:
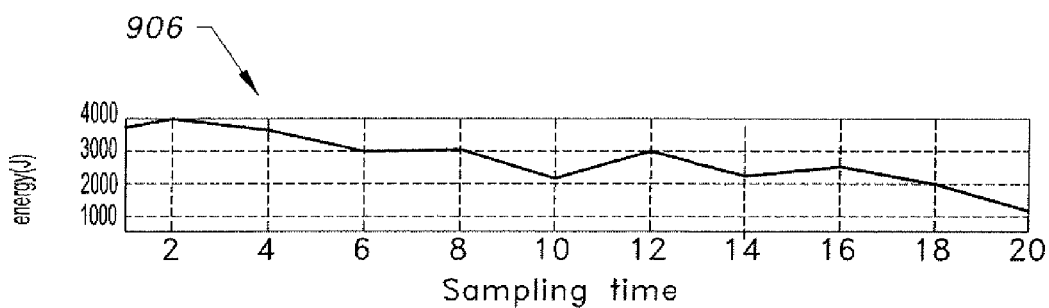
FIG. 9C shows a corresponding energy plot.
Figure 10A:
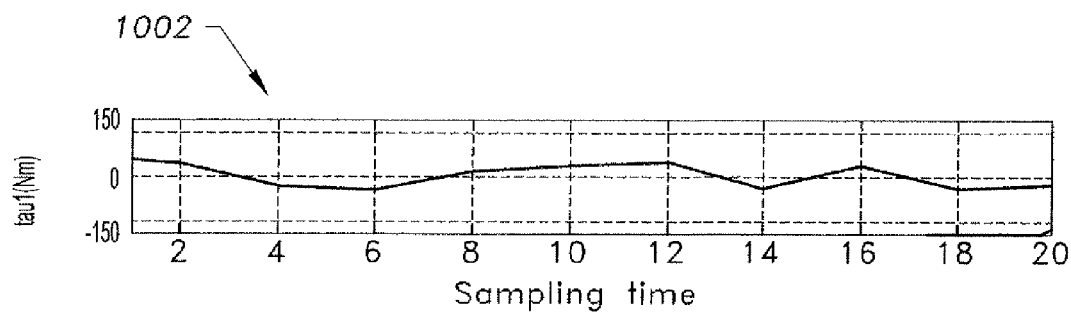
FIG. 10A is a plot showing ALD torques and energies for a first EE mass.
Figure 10B:
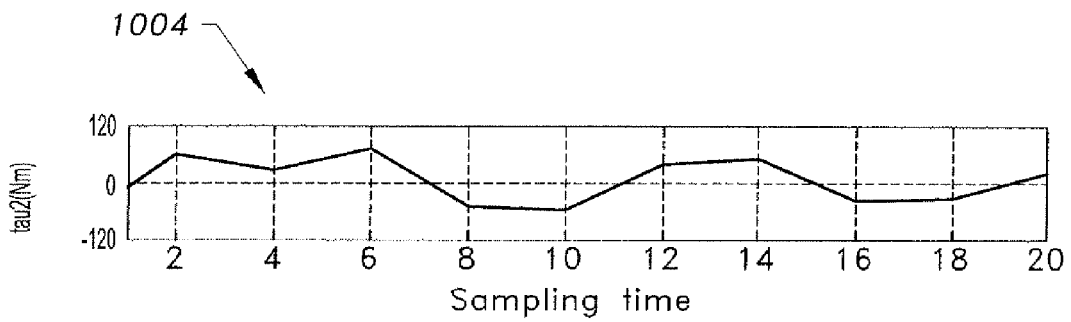
FIG. 10B is a plot showing ALD torques and energies for a second EE mass.
Figure 10C:
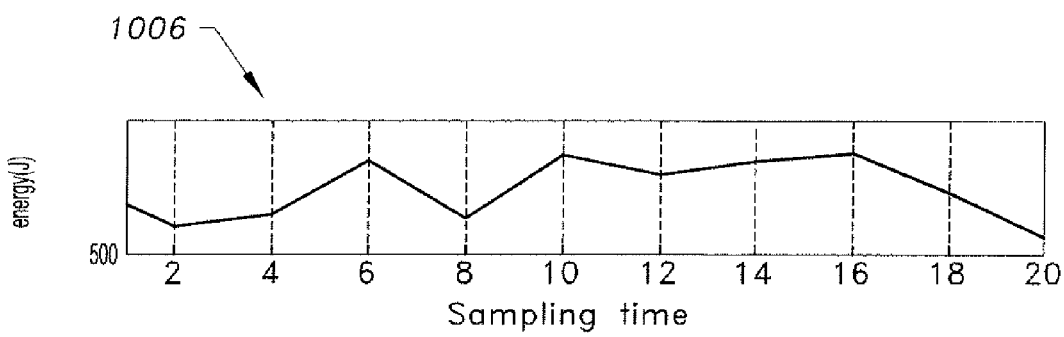
FIG. 10C is a plot showing ALD torques and energies for a third EE mass.
Figure 11A:
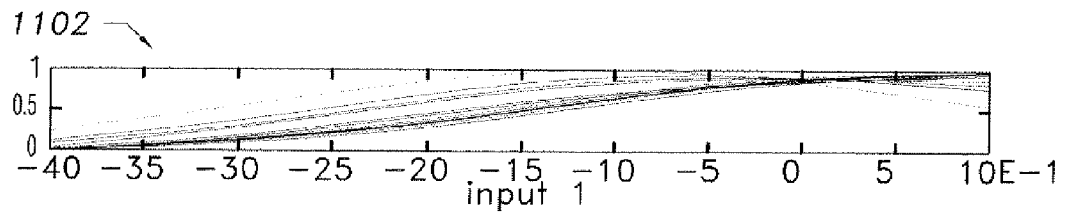
FIG. 11A shows optimized membership function training for input 1.
Figure 11B:
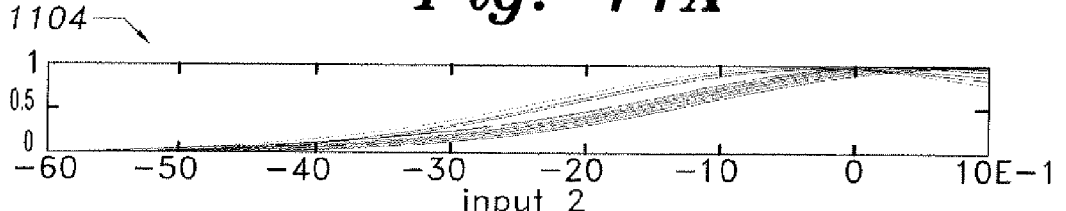
FIG. 11B shows optimized membership function training for input 2.
Figure 11C:
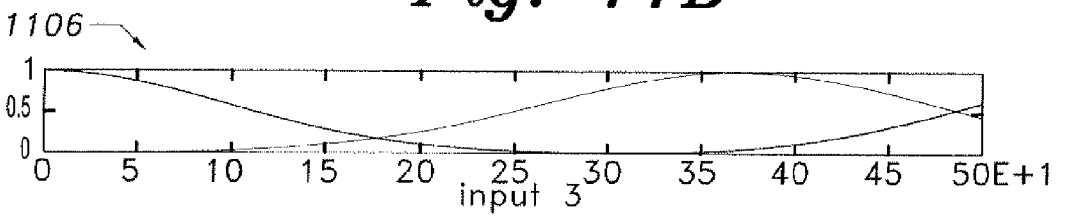
FIG. 11C shows optimized membership function training for input 3.
Figure 11D:
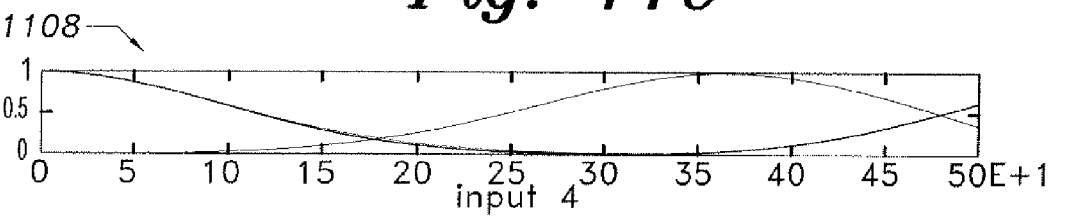
FIG. 11D shows optimized membership function training for input 4.
Figure 11E:
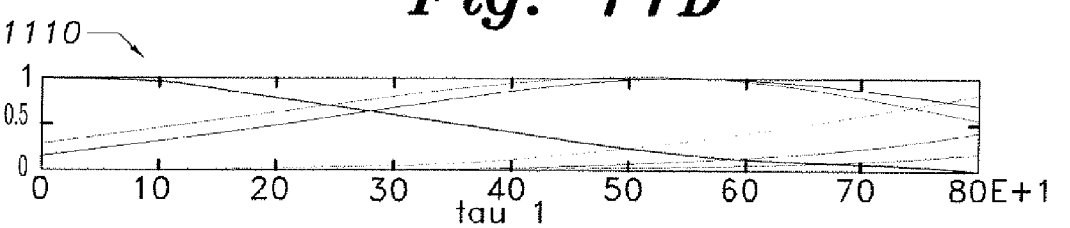
FIG. 11E shows optimized output tau 1.
Figure 11F:
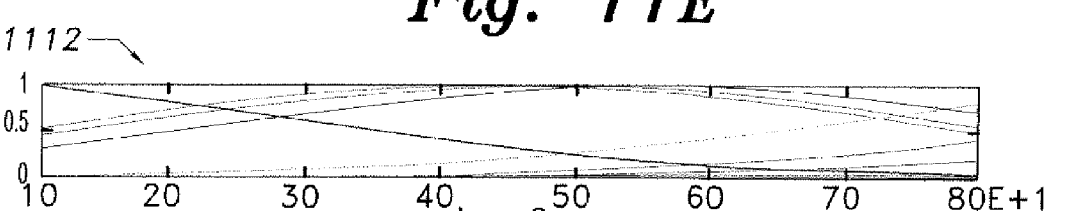
FIG. 11F shows optimized output tau 2.

The values shown for the total traveling time $t_T$, Energy, and AP correspond to those computed for the last outer iteration. As for imposed passages through pre-specified poses, the same scenario is simulated, while constraining the EE to pass through the following positions: (0.0, −1.4), (0.4, −1.1), (0.5, −1.0), all in meters. In FIGS. 9A-9C, plots 902, 904, and 906 show the torques corresponding to ALD trajectory with imposed passages. With seven primal iterations and nine dual iterations, a precision of $7 \cdot 10^4$ was obtained, which confirms the well-known performance of ALD in constraints satisfaction. Another important issue is sensitivity analysis. As PKMs are strongly non-linear and coupled mechanical systems, several of these parameters, such as inertial parameters, are known only approximately or may change. To assess the robustness of the proposed approach to the parameter changes, a first test is performed with a modified value of the EE mass. In FIGS. 10A-10C, plots 1002, 1004, and 1006 show the ALD simulation by varying the EE mass to $m_{EE}$=250 kg. Several scenarios had been implemented, and two hundred multi-objective trajectories with different starting and ending points are generated within the admissible domain.

Figure 12:
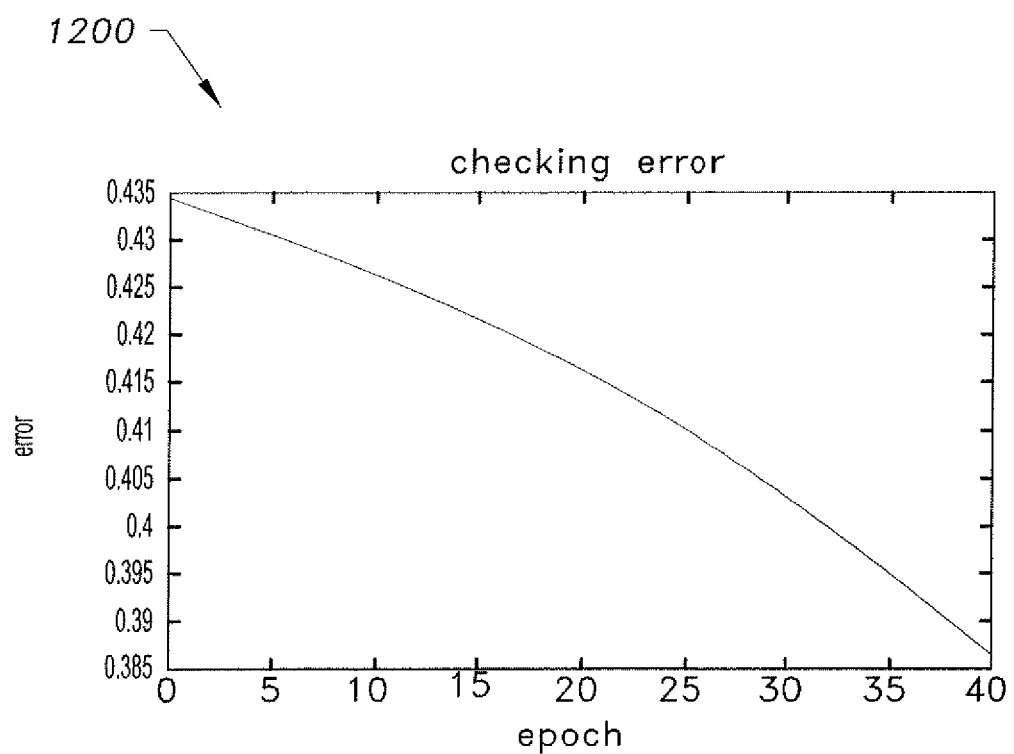
FIG. 12 shows error vs. epoch for the training session optimizing the membership functions of FIGS. 11A-11D.

Regarding the NeFuMOP performance, the subtractive clustering parameters had been set after several trials to the following. The upper acceptance threshold for a data point to be a cluster center is 1.0. The lower rejection ratio is 0.7. The cluster radius is 0.9, and the squash parameter is 0.5. In FIGS. 11A-11F, plots 1102, 1104, 1106, 1108, 1110, and 1112 show the optimized membership functions of the inputs ($x_i$, $y_i$, $\dot{x}_i$, $\dot{y}_i$) and outputs, noted as $\tau_1$ and $\tau_2$. The learning results show very good performance with an error for $\tau_1$ of order 0.0381 and 0.029 for $\tau_2$ in sixty training epochs, as illustrated in plot 1200 of FIG. 12 and summarized in Table 3.

TABLE 3

Performance of NeFuMOP

| 4000 Data entries | RMS Error (after 60 epochs) |
|---|---|
| Training data (90%) | 0.01517 |
| Testing data (10%) | 0.002391 |

NeFuMOP required 283 seconds to learn from the overall 4,000 data points and capture the PKM dynamic behavior. To test the learning and generalization abilities of NeFuMOP, a preliminary test is performed with small modifications (5%) of each of the 10% testing data points, Table 4 shows the learning performance achieved by NeFuMOP, showing that the modified data reached an error of order $10^{-2}$ after 40 training epochs, which highlights very good performance.

TABLE 4

Performance of NeFuMOP (with disturbed testing data)

| 4000 Data entries | RMS Error (after 60 epochs) |
|---|---|
| Training data (90%) | 0.0114217 |
| Testing data (10%) | 0.00221921 |
| Checking data (10%) | 0.002612 |

Figure 13A:
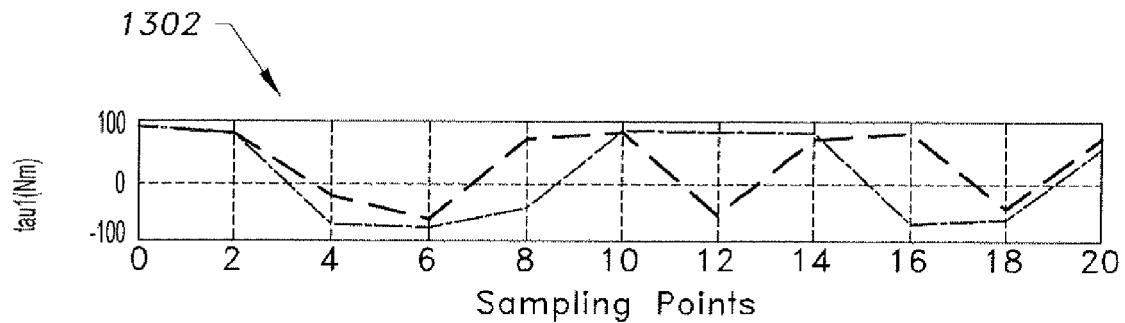
FIG. 13A shows trajectory for tau 1.
Figure 13B:
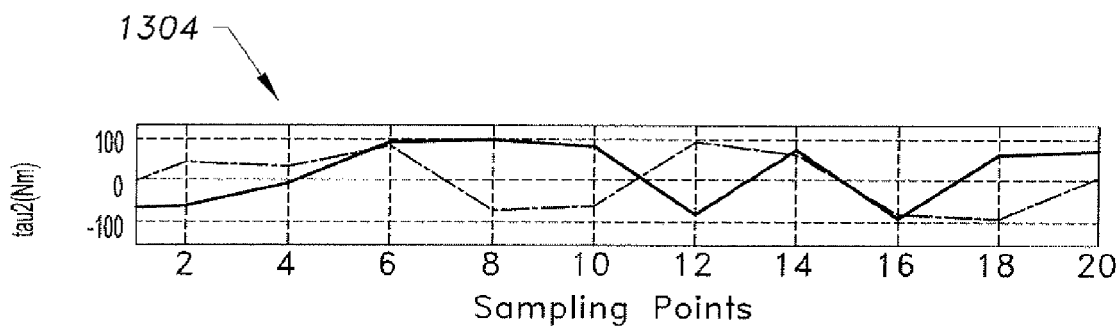
FIG. 13B shows trajectory for tau 2.
Figure 13C:
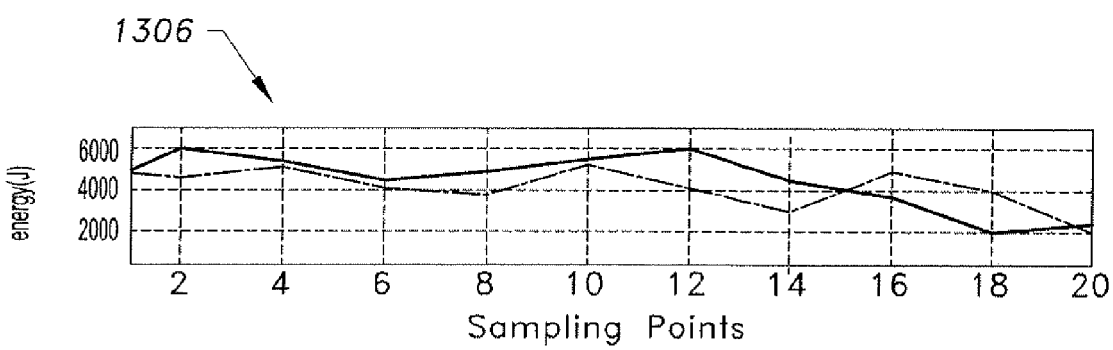
FIG. 13C shows the consumed energy for the trajectories of FIGS. 13A and 13B.

Another test is performed to assess the generalization capabilities of the proposed system. It is made on a trajectory that had been learned using the ALD offline technique, which included moving the PKM-EE along a circle, with a radius (0, −1.4) (m). The ALD technique was used to offline plan this trajectory. The actuator torques and sampling period variations are obtained from the outcomes $o^k$ of NeFuMOP. The trajectory and consumed energy are shown in plots 1302, 1304, and 1306 of FIGS. 13A-13C. It shows very good generalization capabilities of NeFuMOP. At this stage, because NeFuMOP interpolates within the provided trajectories in the training dataset, the optimal solution is generated with NeFuMOP. This constitutes a great advantage as compared to legacy approaches using neuro-fuzzy techniques, which provide trajectories based on pure feasible if/then rules, without optimization or near optimization with respect to given criteria, nor with respect to constraints satisfaction. The method has been implemented on serial manipulators and mobile robots and it gives very satisfactory results. In an ongoing work, it is being implemented on a 6-DOF Stewart-Gough platform.

The basic contribution of the method is a systematic design of a multi-objective trajectory planning system for parallel kinematic machines. This system is built upon the outcomes of an offline planning optimizing traveling time and electric and kinetic energy, and is based on PKMs kinematics and dynamics, as well as velocity, accelerations, actuator torques and workspace limits, while avoiding singularities. The augmented Lagrangian algorithm is implemented on a decoupled dynamics of the PKM. According to simulation results, the offline planning technique produces very good results with singularity-free smoother trajectories, as compared to minimum time, kinematic-based control techniques or other optimization techniques, such as penalty methods. This makes it very suitable for training data generation to use to achieve online motion planning. The neuro-fuzzy model built upon the previous offline generated dataset to achieve online multi-objective motion planning has shown very satisfactory results as well. The high problem conditioning abilities of ALD associated with the modeling and learning capabilities of neuro-fuzzy networks has been proved effective to cope with difficult non-linear dynamics and kinematics of the system, making it possible for the development of the online intelligent multi-objective motion planning for parallel robots.

It is to be understood that the present invention is not limited to the embodiments described above, but encompasses any and all embodiments within the scope of the following claims.

I claim:

1. A computer-implemented parallel kinematic machine trajectory planning method, comprising the steps of:
   (a) selecting new trajectory parameters from an offline dataset having a plurality of training trajectories;
   (b) performing a trajectory initialization;
   (c) formulating, off-line, a mathematical description of a constrained optimization problem for trajectory planning of a parallel kinematic machine (PKM), the mathematical description including:
   a cost minimization function and augmented Lagrange multipliers utilized in an augmented Lagrange decoupling procedure (ALD) to transform the problem into a non-constrained problem;
   an inertia matrix invertibility condition control law specification;
   a discrete dynamic model approximation using a multi-step Adams predictive-corrective formulation initialized with a fourth order Runge-Kutta; and
   a stopping criteria, wherein an iterative solution to the optimization problem describes at least one optimized trajectory;
   (d) saving the at least one optimized trajectory;
   (e) initializing membership function parameters defining fuzzy sets and number of rules for a Tsukamoto neuro-fuzzy inference procedure;
   (f) optimizing the membership function parameters for inputs extracted from the at least one optimized trajectory and outputs of the Tsukamoto neuro-fuzzy inference procedure;
   (g) performing on-line the Tsukamoto neuro-fuzzy inference procedure to further optimize the trajectory of the PKM, the on-line Tsukamoto neuro-fuzzy inference procedure accepting Cartesian 2-dimensional positions and velocities as fuzzy inputs, and outputting joint torques and sampling periods representing further optimization of the at least one optimized trajectory; and
   (h) transferring to the parallel kinetic machine a resultant trajectory planning program based on the further optimization;
   whereby, the PKM executes motion consistent with the further optimization of the at least one optimized trajectory so that time and energy of the PKM motion is optimally minimized.

2. The computer-implemented parallel kinematic machine trajectory planning method according to claim 1, wherein said stopping criteria comprise the total number of said plurality of training trajectories.

3. The computer implemented parallel kinematic machine trajectory planning method according to claim 1, wherein said approximated discrete decoupled dynamics based on fourth order Runge-Kutta initialization is characterized by the relation:

$$x_{k+1} = f_k^D(x_k, v_k, h)$$

wherein x is a robot trajectory position state, v is a robot trajectory velocity state, and h is a representative sampling period.

4. The computer-implemented parallel kinematic machine trajectory planning method according to claim 1, wherein the step of performing the Tsukamoto neuro-fuzzy inference procedure further comprises the steps of:
   characterizing a crisp end effector (EE) position and velocity utilizing a 4-input, first neural layer;
   performing fuzzification of the crisp inputs into linguistic variables through Gaussian transfer functions utilizing a second neural layer;
   applying a product T-norm to produce firing strengths of each rule utilizing a third rule-defining neural layer;
   normalizing firing strengths by calculating a ratio of each rule's firing strength to a sum of all rules' firing strengths, the normalizing firing strengths occurring in a fourth neural layer;
   inverting results of the firing strength normalizing step in a fifth neural layer; and
   aggregating and defuzzifying results from the inverting step, the aggregating and defuzzifying occurring in a sixth neural layer providing crisp outputs including joint torques and sampling periods.

5. The computer-implemented parallel kinematic machine trajectory planning method according to claim 4, wherein said step of performing fuzzification of the crisp inputs into linguistic variables further comprises the step of defining said Gaussian functions by the relation:

$$\mu_{A_t^j}(x_t) = \exp\frac{-1}{2}\left\{\frac{(x_t - a_t^j)^2}{(b_t^j)^2}\right\}, t = 1, \ldots, 4, j = 1, \ldots, J,$$

where $a_t^j$ and $b_t^j$ are a mean and standard deviation of the $j^{th}$ membership function of the input variable $x_t$, and $c_t^j$ are fuzzy sets defining the consequence of the $j^{th}$ rule such that:

$$c_t^j = f^{-1}(\mu_{A_t^j}(x_t)), f: \Re \to [0,1], t=1, \ldots, 3, j=1, \ldots J$$

wherein f is a continuous strong monotone function defined as $$f(z) = \frac{1}{1 + e^{-(\rho z - \sigma)}},$$

where ρ and σ are real numbers affecting the position and slope of the inflection point of f.

6. The computer-implemented parallel kinematic machine trajectory planning method according to claim 4, wherein said sixth neural layer consists of three output neurons.

7. The computer-implemented parallel kinematic machine trajectory planning method according to claim 6, wherein said membership function parameters initializing step further comprises the step of subtractive clustering of the offline planning dataset, the subtractive clustering resulting in a plurality of cluster centers wherein each of the cluster centers is translated into a fuzzy rule for identifying a class.

8. The computer-implemented parallel kinematic machine trajectory planning method according to claim 7, wherein said membership parameters initialization step further comprises the step of initializing a plurality of premise membership function parameters and, and initializing a plurality of consequent parameters ρt, σt associated with said fuzzy rule.

9. The computer-implemented parallel kinematic machine trajectory planning method according to claim 7, further comprising the step of characterizing said inertia matrix invertibility condition control law specification by the relation:

$$u = MJ^{-1}v + Nx_2 + G + [J^T - MJ^{-1}C]f_c - MJ^{-1}jx_2.$$

10. The computer-implemented parallel kinematic machine trajectory planning method according to claim 6, further comprising the step of using a Levenberg-Marquard version of a gradient back-propagation in said neural layers combined with a least square estimate (LSE), to compute said cost minimization function, said cost minimization function evaluating error between network outputs and desired outputs in relation to dynamic behavior of the PKM, said cost minimization function being characterized by the relation:

$$E = \frac{1}{2}\sum_{k=1}^{K} \|o^k - \pi^k\|^2 = \frac{1}{2}\sum_{k=1}^{K}\sum_{j=1}^{J}\sum_{t=1}^{4}[o_{jt}^k(a_t, b_t, \rho_t, \sigma_t) - \pi_{jt}^k]^2,$$

wherein $o^k$ is a computed output from said Tsukamoto neuro-fuzzy inference procedure, $\pi_d$ is a $k^{th}$ desired output associated with a $k^{th}$ training and dataset entry, and J is a number of rules.

11. A computer software product, comprising a medium readable by a processor, the medium having stored thereon a set of instructions for planning the trajectory of a parallel kinematic machine, the set of instructions including:
    (a) a first sequence of instructions which, when executed by the processor, causes the processor to select new trajectory parameters from an offline dataset comprising a plurality of training trajectories;
    (b) a second sequence of instructions which, when executed by the processor, causes the processor to perform a trajectory initialization;
    (c) a third sequence of instructions which, when executed by the processor, causes the processor to formulate offline, a mathematical description of a constrained optimization problem for trajectory planning of a parallel kinematic machine (PKM), the mathematical description including a cost minimization function and augmented Lagrange multipliers utilized in an augmented Lagrange decoupling procedure (ALD) to transform the problem into a non-constrained problem, an inertia matrix invertibility condition control law specification, a discrete dynamic model approximation using a multi-step Adams predictive-corrective formulation initialized with a fourth order Runge-Kutta, and a stopping criteria, wherein an iterative solution to the optimization problem describes at least one optimized trajectory;
    (d) a fourth sequence of instructions which, when executed by the processor, causes the processor to save the at least one optimized trajectory;
    (e) a fifth sequence of instructions which, when executed by the processor, causes the processor to initialize membership function parameters defining fuzzy sets and number of rules for a Tsukamoto neuro-fuzzy inference procedure;
    (f) a sixth sequence of instructions which, when executed by the processor, causes the processor to optimize the membership function parameters for inputs extracted from the at least one optimized trajectory and outputs of the Tsukamoto neuro-fuzzy inference procedure;
    (g) a seventh sequence of instructions which, when executed by the processor, causes the processor to perform on-line the Tsukamoto neuro-fuzzy inference procedure to further optimize the trajectory of the PKM, the on-line Tsukamoto neuro-fuzzy inference procedure accepting Cartesian 2-dimensional positions and velocities as fuzzy inputs, and outputting joint torques and sampling periods representing the further optimization of the at least one optimized trajectory;
    (h) a eighth sequence of instructions which, when executed by the processor, causes the processor to transfer to the parallel kinetic machine a resultant trajectory planning program based on the further optimization;
    whereby the PKM executes motion consistent with the further optimization of the at least one optimized trajectory so that time and energy of the PKM motion is optimally minimized.

12. The computer software product according to claim 11, further comprising a ninth sequence of instructions which, when executed by the processor, causes said processor to use a total number of said plurality of training trajectories as said stopping criteria.

13. The computer software product according to claim 11, further comprising a tenth sequence of instructions which, when executed by the processor, causes said processor to characterize said approximated discrete decoupled dynamics based on said fourth order Runge-Kutta initialization by the relation $x_{k+1} = (x_k, v_k, h)$, wherein x is a robot trajectory position state, v is a robot trajectory velocity state and h is a representative sampling period.

14. The computer software product according to claim 11, further comprising:
    an eleventh sequence of instructions which, when executed by the processor, causes said processor to characterize a crisp EE position and velocity utilizing a 4-input, first neural layer;
    a twelfth sequence of instructions which, when executed by the processor, causes said processor to perform fuzzification of said crisp inputs into linguistic variables through Gaussian transfer functions utilizing a second neural layer;
    a thirteenth sequence of instructions which, when executed by the processor, causes said processor to apply a product T-norm to produce firing strengths of each rule utilizing a third rule defining neural layer;
    a fourteenth sequence of instructions which, when executed by the processor, causes said processor to normalize firing strengths by calculating a ratio of each rule's firing strength to a sum of all rules' firing strengths, said normalizing firing strengths occurring in a fourth neural layer;
    a fifteenth sequence of instructions which, when executed by the processor, causes said processor to invert results of said firing strength normalizing step in a fifth neural layer; and
    a sixteenth sequence of instructions which, when executed by the processor, causes said processor to aggregate and defuzzify results from said the inversion in the fifteenth sequence, said aggregating and defuzzifying occurring in a sixth neural layer providing crisp outputs comprised of said joint torques and said sampling periods.

15. The computer software product according to claim 14, further comprising:
    a seventeenth sequence of instructions which, when executed by the processor, causes said processor to define said Gaussian transfer functions by the relation:

$$\mu_{A_t^j}(x_t) = \exp\frac{-1}{2}\left\{\frac{(x_t - a_t^j)^2}{(b_t^j)^2}\right\}, t = 1, \ldots, 4, j = 1, \ldots, J,$$

wherein $a_t^j$ and $b_t^j$ are a mean and standard deviation of the $j^{th}$ membership function of the input variable $x_t$, and $c_t^j$ are fuzzy sets defining the consequence of the $j^{th}$ rule, such that:

$$c_t^j = f^{-1}(\mu_{A_t^h}(x_t)), f: \Re \rightarrow [0,1], t=1,\ldots,3, j=1,\ldots,J$$

wherein f is a continuous strong monotone function defined as:

$$f(z) = \frac{1}{1 + e^{-(\rho z - \sigma)}}$$

wherein $\rho$ and $\sigma$ are real numbers affecting the position and slope of the inflection point of f.

16. The computer software product according to claim 14, further comprising an eighteenth sequence of instructions which, when executed by the processor, causes said processor to form only three output neurons for said sixth neural layer.

17. The computer software product according to claim 16, further comprising a nineteenth sequence of instructions which, when executed by the processor, causes said processor to perform subtractive clustering of said offline planning dataset during said membership function parameters initialization, the subtractive clustering resulting in a plurality of cluster centers wherein each of the cluster centers is translated into a fuzzy rule for identifying a class.

18. The computer software product according to claim 17, further comprising a twenty-first sequence of instructions which, when executed by the processor, causes said processor, during said membership parameters initialization in said fifth sequence, to initialize a plurality of premise membership function parameters and, to initialize a plurality of consequent parameters $\rho t$, $\sigma t$ associated with said fuzzy rule.

19. The computer software product according to claim 17, further comprising a twenty-second sequence of instructions which, when executed by the processor, causes said processor to characterize said inertia matrix invertibility condition control law specification by the relation:

$$u = MJ^{-1}v + Nx_2 + G + [J^T - MJ^{-1}C]f_c - MJ^{-1}Jx_2.$$

wherein the twenty-second sequence of instructions is executed during said performance of said Tsukamoto neuro-fuzzy inference procedure.

20. The computer software product according to claim 16, further comprising a twentieth sequence of instructions which, when executed by the processor, causes said processor to use a Levenberg-Marquard version of a gradient back-propagation in said neural layers combined with a least square estimate (LSE), to compute said cost minimization function, said cost minimization function evaluating error between network outputs and desired outputs in relation to dynamic behavior of the PKM, said cost minimization function being characterized by the relation:

$$E = \frac{1}{2}\sum_{k=1}^{K}\|o^k - \pi^k\|^2 = \frac{1}{2}\sum_{k=1}^{K}\sum_{j=1}^{J}\sum_{t=1}^{4}[o_{jt}^k(a_t, b_t, \rho_t, \sigma_t) - \pi_{jt}^k]^2,$$

wherein $o^k$ is a computed output from said Tsukamoto neuro-fuzzy inference procedure, $\pi_d^k$ is a $k^{th}$ desired output associated with a $k_{th}$ training and dataset entry, and J is a number of rules.

* * * * *